United States Patent
Cui et al.

(10) Patent No.: US 12,160,783 B2
(45) Date of Patent: Dec. 3, 2024

(54) HANDOVER WITH PSCELL BASED ON TRIGGER MESSAGE

(71) Applicant: APPLE INC., Cupertino, CA (US)

(72) Inventors: Jie Cui, Cupertino, CA (US); Qiming Li, Beijing (CN); Yang Tang, Cupertino, CA (US); Manasa Raghavan, Cupertino, CA (US); Xiang Chen, Cupertino, CA (US); Huaning Niu, Cupertino, CA (US); Dawei Zhang, Cupertino, CA (US); Hong He, Cupertino, CA (US); Fangli Xu, Beijing (CN); Haitong Sun, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 533 days.

(21) Appl. No.: 17/593,179

(22) PCT Filed: Jan. 15, 2021

(86) PCT No.: PCT/CN2021/072301
§ 371 (c)(1),
(2) Date: Sep. 10, 2021

(87) PCT Pub. No.: WO2022/151417
PCT Pub. Date: Jul. 21, 2022

(65) Prior Publication Data
US 2023/0180075 A1 Jun. 8, 2023

(51) Int. Cl.
*H04W 36/00* (2009.01)
*H04W 74/04* (2009.01)
*H04W 74/0833* (2024.01)

(52) U.S. Cl.
CPC ........... *H04W 36/00837* (2018.08); *H04W 36/00698* (2023.05); *H04W 74/04* (2013.01); *H04W 74/0833* (2013.01)

(58) Field of Classification Search
None
See application file for complete search history.

(56) References Cited

U.S. PATENT DOCUMENTS

2014/0335863 A1* 11/2014 Wu ............... H04W 76/28
455/436
2015/0163709 A1* 6/2015 Lee ............... H04L 65/1016
370/332
(Continued)

FOREIGN PATENT DOCUMENTS

CN 1780467 A * 5/2006
CN 108064060 A * 5/2018 ........ H04W 36/0011
(Continued)

OTHER PUBLICATIONS

PCT/CN2021/072301, International Search Report and Written Opinion, Sep. 29, 2021, 8 pages.
(Continued)

*Primary Examiner* — Andrew C Oh
(74) *Attorney, Agent, or Firm* — Dorsey & Whitney LLP

(57) ABSTRACT

Provided is a method for a user equipment. The method includes starting performing a handover (HO) with a target Primary Secondary Cell (PSCell) in response to receiving an HO command instructing the HO with the target PSCell, wherein the HO with the target PSCell comprises target PSCell addition/change, and performing the target PSCell addition/change in response to receiving a trigger message from a target Primary Cell (PCell) or sending a trigger message to the target PCell, wherein the trigger message is a message transmitted between the UE and the target PCell during the HO with the target PSCell.

14 Claims, 12 Drawing Sheets

(56) References Cited

U.S. PATENT DOCUMENTS

| | | | |
|---|---|---|---|
| 2017/0289889 A1* | 10/2017 | Sahu | H04W 24/10 |
| 2018/0124784 A1* | 5/2018 | Kumar | H04W 52/0206 |
| 2019/0090227 A1* | 3/2019 | Tsai | H04W 72/27 |
| 2019/0349822 A1 | 11/2019 | Kim et al. | |
| 2019/0356536 A1* | 11/2019 | Lee | H04L 41/0654 |
| 2021/0029724 A1* | 1/2021 | Tsai | H04W 28/0278 |
| 2021/0068129 A1* | 3/2021 | Ryu | H04W 80/02 |
| 2021/0195513 A1* | 6/2021 | Zhang | H04W 24/10 |
| 2021/0195650 A1* | 6/2021 | Zhang | H04W 72/0446 |
| 2021/0195651 A1* | 6/2021 | Zhang | H04B 7/0695 |
| 2022/0060283 A1* | 2/2022 | Wang | H04L 1/08 |
| 2022/0086031 A1* | 3/2022 | Icolari | H04L 1/20 |

FOREIGN PATENT DOCUMENTS

| | | | | |
|---|---|---|---|---|
| CN | 109479336 A | * | 3/2019 | H04W 12/106 |
| CN | 110545567 A | | 12/2019 | |
| CN | 110546992 A | | 12/2019 | |
| CN | 106789800 B | * | 4/2020 | H04L 27/26 |
| CN | 111698653 A | * | 9/2020 | H04M 7/006 |
| CN | 111901839 A | | 11/2020 | |
| CN | 106973417 B | * | 1/2021 | H04W 36/0066 |
| CN | 113455049 A | * | 9/2021 | H04L 5/001 |
| CN | 113647170 A | * | 11/2021 | H04W 24/10 |
| CN | 114556847 A | * | 5/2022 | H04B 17/328 |
| CN | 116097816 A | * | 5/2023 | H04B 7/0626 |
| CN | 116686336 A | * | 9/2023 | H04W 24/02 |
| DE | 112019006104 T5 | * | 8/2021 | H04W 36/0027 |
| EP | 2760236 A1 | * | 7/2014 | H04W 36/0094 |
| EP | 3059891 A1 | * | 8/2016 | H04B 7/0413 |
| EP | 3681243 A1 | * | 7/2020 | H04W 36/0055 |
| FR | 3088792 A1 | * | 5/2020 | H04W 28/06 |
| KR | 20190138901 A | * | 12/2019 | |
| WO | WO-2010105677 A1 | * | 9/2010 | H04W 36/0083 |
| WO | WO-2011039976 A1 | * | 4/2011 | H04W 36/32 |
| WO | WO-2014148874 A1 | * | 9/2014 | H04W 36/0066 |
| WO | WO-2014163450 A1 | * | 10/2014 | H04W 36/0061 |
| WO | WO-2014196748 A1 | * | 12/2014 | H04W 36/04 |
| WO | WO-2017139014 A1 | * | 8/2017 | H04W 24/00 |
| WO | WO-2018128572 A1 | * | 7/2018 | H04W 36/0069 |
| WO | WO-2018156696 A1 | * | 8/2018 | H04W 36/0072 |
| WO | WO-2020061962 A1 | * | 4/2020 | |
| WO | WO-2020122796 A1 | | 6/2020 | |
| WO | WO-2020149650 A1 | * | 7/2020 | H04W 24/08 |
| WO | WO-2020164073 A1 | * | 8/2020 | |
| WO | WO-2020263474 A1 | * | 12/2020 | H04W 52/325 |
| WO | WO-2021006804 A1 | * | 1/2021 | H04W 24/02 |
| WO | WO-2021009410 A1 | * | 1/2021 | H04W 36/0058 |
| WO | WO-2021051357 A1 | * | 3/2021 | H04W 36/0077 |
| WO | WO-2021064032 A1 | * | 4/2021 | H04W 12/041 |
| WO | WO-2021067236 A1 | * | 4/2021 | H04W 24/08 |
| WO | WO-2021075844 A1 | * | 4/2021 | H04W 36/0058 |
| WO | WO-2021091629 A1 | * | 5/2021 | H04W 36/0069 |

OTHER PUBLICATIONS

Qualcomm Incorporated, "On conditional PSCell addition/change", R4-2000725, 3GPP TSG-RAN WG4 Meeting #94-e, Online, Agenda Item 8.3.2.3, Feb. 24-Mar. 6, 2020, 6 pages.

* cited by examiner

HANDOVER WITH PSCELL BASED ON TRIGGER MESSAGE

TECHNICAL FIELD

This application relates generally to wireless communication systems, and more specifically to a method and apparatus for handover with primary secondary cell (PS-Cell).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment is provided that includes: starting performing a handover (HO) with a target Primary Secondary Cell (PSCell) in response to receiving an HO command instructing the HO with the target PSCell, wherein the HO with the target PSCell comprises target PSCell addition/change; and performing the target PSCell addition/change in response to receiving a trigger message from a target Primary Cell (PCell) or sending a trigger message to the target PCell, wherein the trigger message is a message transmitted between the UE and the target PCell during the HO with the target PSCell.

According to an aspect of the present disclosure, an apparatus for a user equipment is provided that includes one or more processors configured to perform steps of the method according to the method described above.

According to an aspect of the present disclosure, a computer readable medium is provided that has computer programs stored thereon which, when executed by one or more processors, cause an apparatus to perform steps of the method according to the method described above.

According to an aspect of the present disclosure, an apparatus for communication is provided which includes means for performing steps of the method according to the method described above.

According to an aspect of the present disclosure, a computer program product is provided that includes computer programs which, when executed by one or more processors, cause an apparatus to perform steps of the method according to the method described above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In order to increase the bandwidth and thus increasing the bitrate, a user equipment (UE) may be connected to mote than one serving cell. In New Radio (NR), one serving cell may be designated as a primary cell (PCell), while some other cells may be secondary cells (SCells). In some cases, a PCell and SCells for UE may correspond to (supported by) a same base station. In some other cases, PCell and SCells may correspond to (supported by) different base stations.

Figure 1:
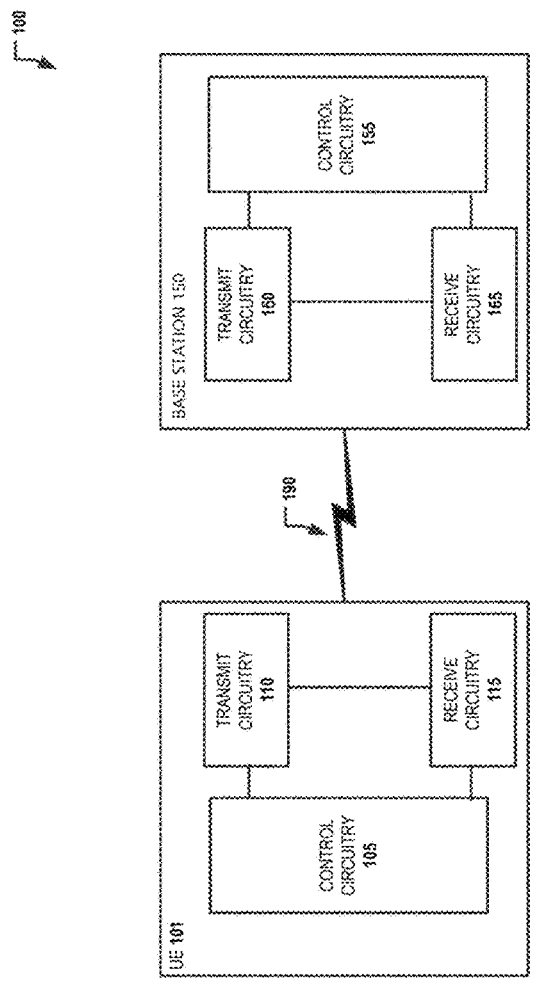
FIG. 1 is a block diagram of a system including a base station and a user equipment (UTE) in accordance with some embodiments of the present application.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The t and various base stations 1 for example, base stations that support all kinds of serving cells including PCell and SCell, or base stations that act as the network device of PCell or SCell for communicating with the UE) described in the following embodiments may be implemented by the UE 101 and the base station 150 described in FIG. 1.

In the related art, the wireless communication system may include multiple network modes. For example, the network mode of the 5G wireless communication system may include an independent networking mode (such as NR SA) and an MR-DC mode. The MR-DC mode may include EN-DC mode, NE-DC mode, and NR-DC mode. EN-DC refers to the dual connection of 4G wireless access network and 5G NR, where a 4G base station is a primary base station, and a 5G base station is a secondary base station. NE-DC refers to the dual connection of 5G NR and 4G wireless access network, where a 5G base station is a primary base station, and a 4G base station is a secondary base station. NR-DC mode refers to the dual connection of 5G NR in the low frequency band (such as 700%800/900 MHz frequency band) and 5G NR in the high frequency band (such as millimeter wave frequency band). The primary base station in NR-DC mode can be a low-band 5G base station, and the secondary base station can be a high-band 5G base station. The primary base station in the NR-DC mode can be a high-band 5G base station, and the secondary base station can be a low-band 5G base station.

In the related art, the UE can perform an HO with PSCell in response to receiving a handover (HO) command instructing an HO with a target PSCell. Through the HO with the PSCell, UE can switch from one network mode to another. UE behaviors in the process of the HO with PSCell have not yet been standardized.

In view of the foregoing, the present disclosure provides user equipment (UE) behaviors for an HO with PSCell, during the process of the HO with a target PSCell. In response to receiving a trigger message from a target PCell or sending a trigger message to the target PCell, the UE performs PSCell addition/change.

Therefore, since there is a time gap or a transition period between the time when the UE sends the trigger message or the time when the UE receives the trigger message and the time when the HO command is received, it is enabled that the source PSCell for UE release time (a time gap or transition period) is fully implemented by the UE during the HO with a new PSCell.

In the present disclosure, existing requirements for HO and PSCell addition/change are considered as baseline.

Note that in the present disclosure when describing a communication between a U E and a network (for example, transmitting to a network, receiving from a network), the communication between the UE and the network may include the communication between the UE/an apparatus of the UE and the network/a network device (node) in the network. Similarly, in the present disclosure, when describing a communication between a UE and a serving cell including but not limited to PCell and SCell (for example, transmitting to PCell or SCell, receiving from PCell or SCell), the communication between the UE and the serving cell may include the communication between the UE/an apparatus of the UE and the network device (node) of the cell including but not limited to PCell and SCell. Also note that, the expression "network device" and the expression "node" may be used herein interchangeably. In other words, when reference is made to "network device", it also refers to "node".

Figure 2:
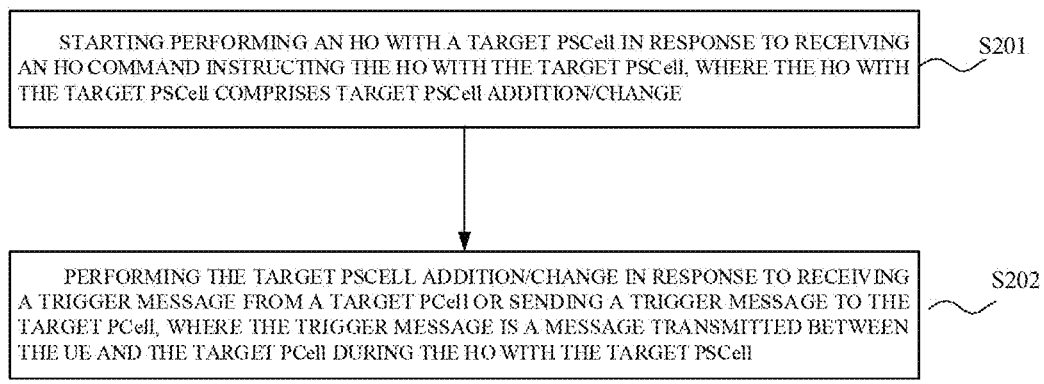
FIG. 2 illustrates a flowchart for an exemplary method for a user device in accordance with some embodiments of the present application.

FIG. 2 illustrates a flowchart of a method for a UE according to exemplary embodiments of the present disclosure.

The method may include the following steps.

In step 201, the UE starts to perform a handover (HO) with a target Primary Secondary Cell (PSCell) in response to receiving an HO command instructing the HO with the target PSCell, where the HO with the target PSCell includes target PSCell addition/change.

In step 202, the UE performs the target PSCell addition/change in response to receiving a trigger message from the target Primary Cell (PCell) or sending a trigger message to the target PCell, where the trigger message is a message transmitted between the UE and the target PCell during the HO with the target PSCell.

The principle of embodiments of the present disclosure is as follows. The Applicant found that a UE would perform hard disconnection from a source PSCell after it decodes the HO command with the target PSCell in response to receiving a command of the HO with the target PSCell. Hard disconnection means that the UE disconnects an RRC/MAC/PHY connection with the source PSCell without any release time. That is, the source PSCell release time (a time gap or transition period) is not implemented by the UE during the HO with the target PSCell, which also means that the UE would start the HO after it decodes the HO command with the target PSCell without any transition time for the source PSCell to release. To solve this technical problem, in some embodiments of the present disclosure, a PSCell addition/change is performed in response to receiving a trigger message from the target PCell or sending a trigger message to the target PCell during the HO with the target PSCell. Thus, there is a time gap or transition period between the time when the UE sends the trigger message or the UE receives the trigger message and the time when the HO command is received, which provides the source PSCell release time. In addition, the trigger message is a message transmitted between the UE and the target PCell in the process of the HO with the target PSCell, and does not require any improvements on the network side, which is easy for implementation.

Unless otherwise specified, the HO command may be used for instructing an HO with PSCell, where HO may refer to switching PCell. An HO with a PSCell may refer to performing PSCell addition/change while switching PCell.

An HO command can be received from the network side. For example, the HO command is received from a source PCell.

Taking 5G wireless communication system as an example, when an HO command is received, the current network mode of the UE may be, but not limited to, any of: New Radio (NR) standalone (SA), Long Term Evolution (LTE)-New Radio Dual connectivity (EN-DC), New Radio-E-UTRA Dual connectivity (NE-DC) and New Radio Dual connectivity (NR-DC).

Furthermore, the HO with PSCell scenarios could include any one of: NR SA to EN-DC. EN-DC to EN-DC, NE-DC to NE-DC, and NR-DC to NR-DC.

According to some embodiments, the UE may access the target PSCell via Contention Free Random Access (CFRA) and Contention Based Random Access (CBRA).

Figure 3:
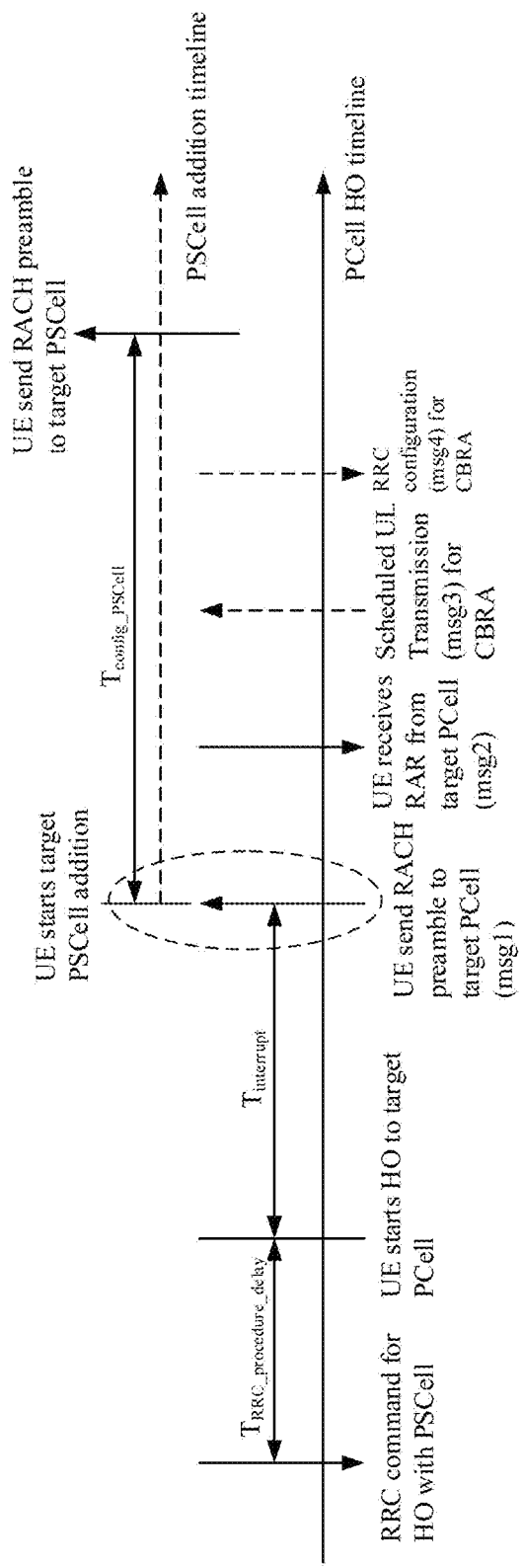
FIG. 3 to FIG. 7 illustrates a flowchart for an exemplary period planning for handover with PSCell addition/change in accordance with some embodiments of the present application.

Referring to FIG. 3, taking a UE accessing a target PSCell via CBRA as an example, during an HO with the target PSCell, according to a time sequence, the messages transmitted between the UE and the target PSCell may be RACH preamble (msg 1) sent to the target PCell, RAR (msg 2) received from the target PCell, scheduled uplink (UL) transmission for CBRA (msg 3), RRC configuration (msg4) for CBRA received from the target PCell, and RRC reconfiguration complete message sent to the target PCell, etc.

According to some embodiments, based on the time points of the messages transmitted between the UE and the target PCell and the time point of an HO command received in the HO with the target PSCell process, one of the messages may be determined as a trigger message, to which the present disclosure is not limited in this regard.

Hereinafter, in step S202, the time point when UE starts to perform the target PSCell addition/change during the HO with the target PSCell, will be described in detail with reference to several exemplary embodiments.

For example, the PSCell addition/change may include downlink cell synchronization, automatic gain control (AGC) settling or T/F tracking.

In a first exemplary embodiment (hereinafter referred to as "alt1"), as shown in FIG. 3, the performing the HO with a target PSCell further includes obtaining a RACH occasion for sending a RACH preamble to the target PCell, where the trigger message is the RACH preamble, and where the performing the target PSCell addition/change includes performing the target PSCell addition/change in response to determining that the RACH preamble has been sent. As can be seen from FIG. 3, in this situation, the delay of the HO with the target PSCell could be short if the RACH switching to the target PCell is successful. The solution provided in this exemplary embodiment may be applied to cases where the UE accesses the target PSCell via either CFBA or CBRA.

Obtaining a RACH preamble may refer to that the RACH preamble is generated by the UE itself, or that the RACH preamble is received from other devices.

Figure 4:
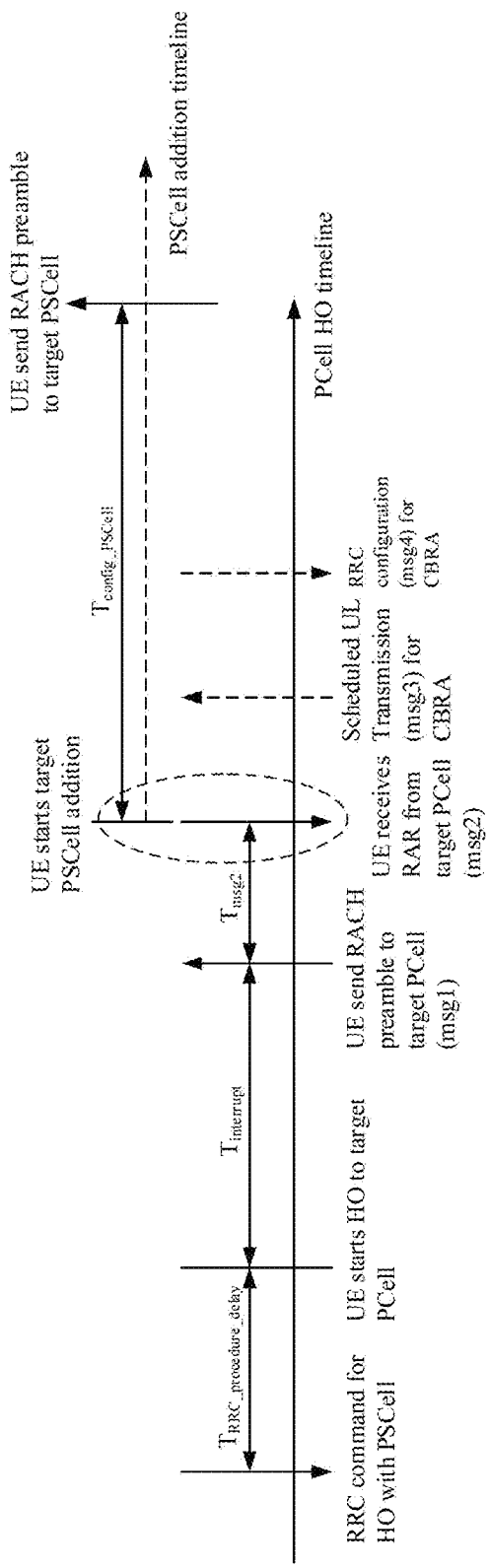

In a second exemplary embodiment (hereinafter referred to as "alt2"), as shown in FIG. 4, the performing the HO with a target PSCell further includes obtaining a RACH occasion for sending a RACH preamble to the target PCell, where the trigger message is a Random Access Response (RAR, i.e., msg2) generated by the target PCell in response to receiving the RACH preamble, and where the performing the target PSCell addition/change includes performing the target PSCell addition/change in response to receiving the RAR. As can be seen from FIG. 4, in this situation, this alternative has a better reliability than alt1, especially when the CFRA is used to access the target PCell by the UE, while the delay of the HO with PSCell could be longer than alt1 since the time delay for receiving RAR ($T_{msg2}$ in FIG. 4) shall be included. The solution provided in this exemplary embodiment may be applied to cases where the UE accesses the target PSCell via either CFBA or CBRA.

Figure 5:
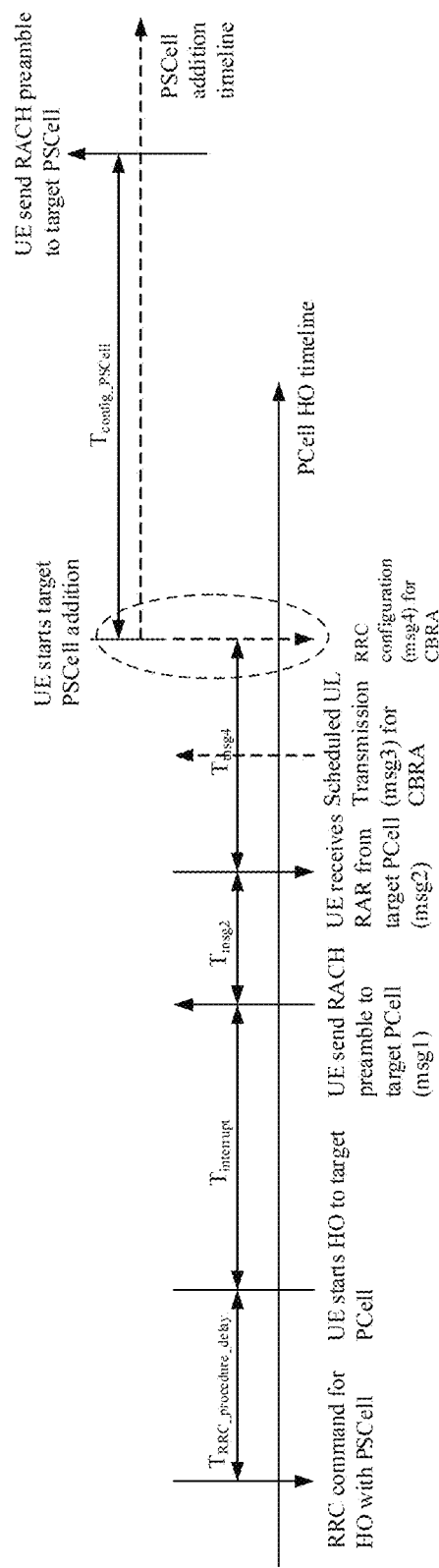

In a third exemplary embodiment (hereinafter referred to as "alt3"), as shown in FIG. 5, the performing the HO with the target PSCell further includes: accessing the target PCell via Contention Based Random Access (CBRA); generating an uplink scheduling message for CBRA for sending to the target PCell, where the trigger message is a radio resource control (RRC) configuration for CBRA (msg4) generated by the target PCell in response to receiving the uplink scheduling message, and where the performing the target PSCell addition/change includes performing the target PSCell addition/change in response to receiving the radio resource control (RRC) configuration for CBRA. As can be seen from FIG. 5, in this situation, the reliability of alt3 is the highest compared with alt1 and alt2 for CBRA to PCell, with the time delay for receiving msg4 being included ($T_{msg4}$ in FIG. 5). The solution provided in this exemplary embodiment may be applicable to the case where the UE accesses the target PSCell via CBRA, but not to the case where the UE accesses the target PSCell via CFBA.

Figure 6:
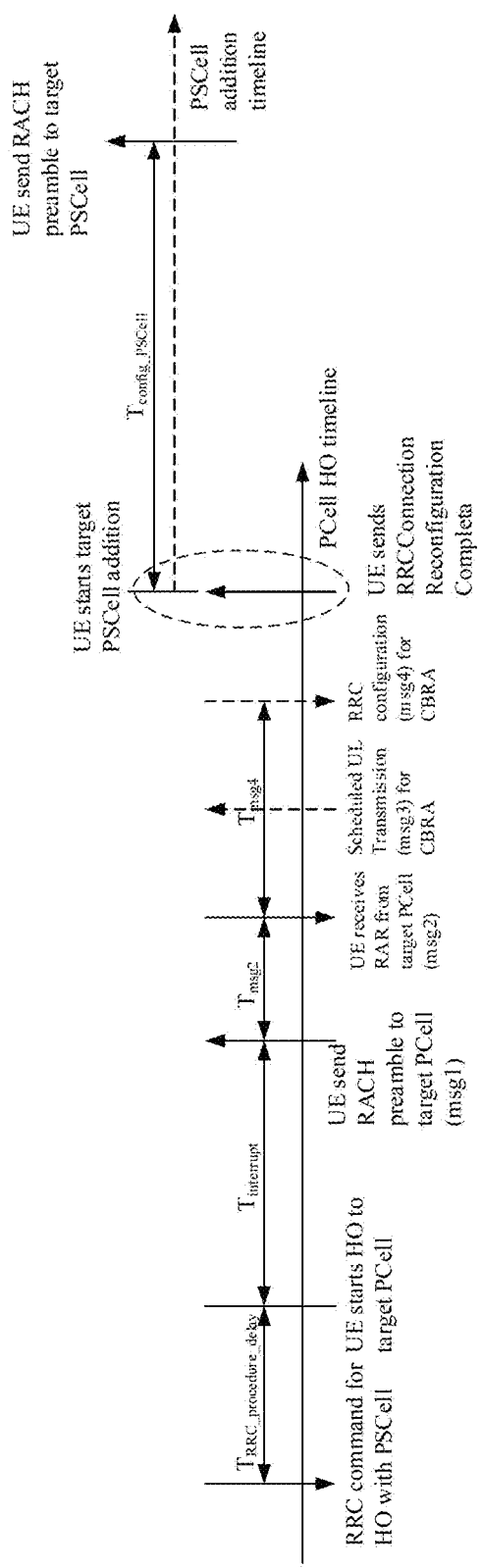

In a fourth exemplary embodiment (hereinafter referred to as "alt4"), as shown in FIG. 6, the performing the HO with the target PSCell further includes generating an RRC reconfiguration complete message for sending to the target PCell, in response to determining that RRC configuration is complete, where the trigger message is the RRC reconfiguration complete message, and where the performing the target PSCell addition/change includes performing the target PSCell addition/change in response to the RRC reconfiguration complete having been sent. In this situation, the reliability of this alternative is the highest. The solution provided in this exemplary embodiment may be applicable to cases where the UE accesses the target PSCell via either CFBA or CBRA.

Figure 7:
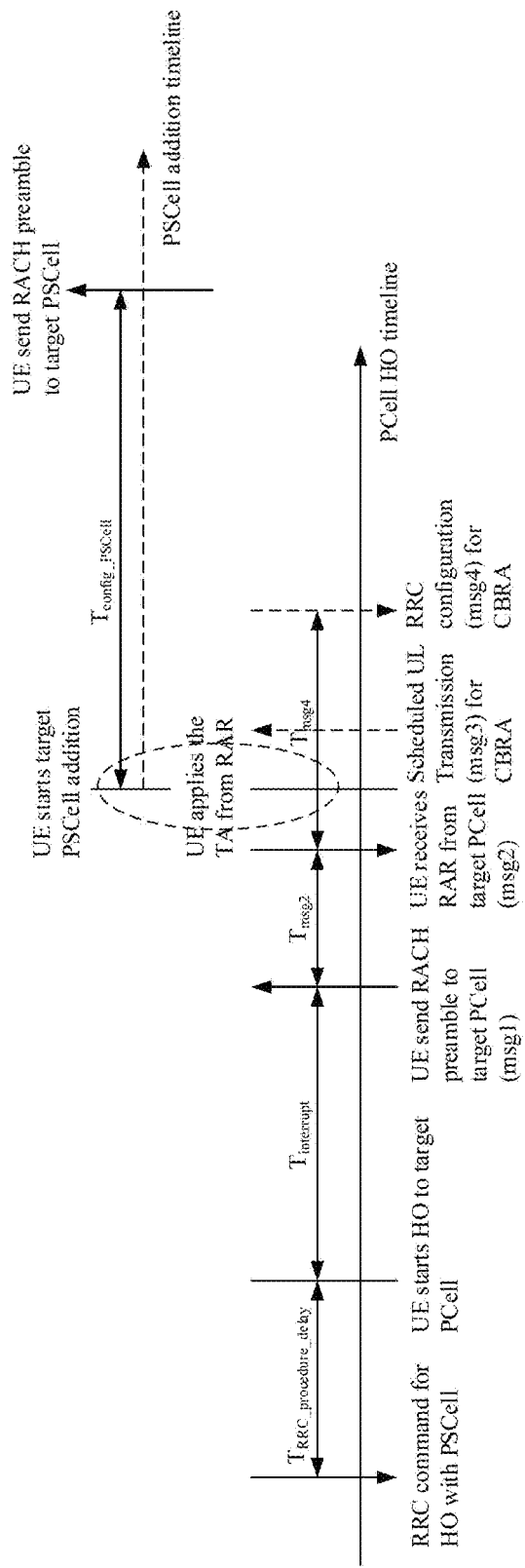

In a fifth exemplary embodiment (hereinafter referred to as "alt5"), as shown in FIG. 7, the performing the HO with the target PSCell includes obtaining a Random Access Channel (RACH) occasion for sending to a RACH preamble the target PCell, where the trigger message is an RAR generated by the target PCell in response to receiving the RACH preamble and the UE being ready to apply a Timing Advance (TA) command carried in the RAR, and the performing the target PSCell addition/change includes performing the target PSCell addition/change in response to receiving the RAR and executing the TA command.

The time point when UE starts to perform a target PSCell addition/change during an HO with a PSCell has been described above in detail in conjunction with several exemplary embodiments. It should be noted that it is not limited herein that a trigger message is a message transmitted between a UE and a target PCell during the HO with the target PSCell as provided in the above exemplary embodiments. Alternatively, the trigger message can also be other information transmitted between the UE and a PCell during the HO with the target PSCell.

The embodiments above are optimizations for the situation where a UE performs hard disconnection from a source PSCell after the UE decodes an HO command instructing the HO with a target PSCell. In the optimizations, in the process of the HO with the target PSCell, the target PSCell addition/change is performed in response to receiving the trigger message from the target PCell or sending a trigger message to the target PCell. As such it is enabled that the source PSCell for UE release time is fully implemented by the UE during the HO with new PSCell.

According to some embodiments, in step 201, the starting performing a handover (HO) with a target Primary Secondary Cell (PSCell) in response to receiving the HO command instructing the HO with the target PSCell may include: performing timekeeping in response to receiving the HO command; and starting performing the HO with the target PSCell in response to the timekeeping reaching a preset release time. As a result, the UE may perform soft disconnection from an old PSCell after it decodes the HO command instructing the HO with the target PSCell. Soft disconnection means that a UE disconnects an RRC/MAC/PHY connection from a source PSCell with a predefined release time (or transition period), within which the UE would not perform any HO behavior, i.e., the UE will start an HO after this release time.

By combining the optimizations where the LIE performs hard disconnection with the source PSCell and soft disconnection with the source PSCell, it could be further ensured that the source PSCell is fully released by the UE during the HO with the target PSCell.

In the process of the HO with a target PSCell, the UE behaviors are not limited to those described above. According to some embodiments, a capability indication is obtained indicating whether the UE supports HO with PSCell addition/change in Multi-RAT Dual Connectivity (MR-DC) for sending to a network, where the HO command is generated by the network at least in response to determining that the obtained capability indication indicates that the LIE supports the HO with PSCell addition/change. Therefore, whether a LIE can support handover with PSCell addition/change in MR-DC may be indicated by introducing a new capability indication from LIE to network.

Obtaining a capability indication means that the capability indication is generated by the UE itself, or that the UE receives the capability indication from another device.

For example, the capability indication may be per-LIE basis. In this situation, a capability indication of the UE can be configured according to a first preset rule. The first preset rule may be set according to actual requirements, which is not limited here. For example, the first preset rule may be set according to the processing capability of the UE.

For example, the capability indication could be per-band combination (BC) basis. In this situation, the capability indication of the UE may be configured based on a per-band combination (for example, a combination of a working frequency band of a primary base station and a working frequency band of a secondary base station in the MR-DC network mode of the target PCell) according to a second preset rule. The second preset rule can be set according to actual needs and is not limited here.

For example, the capability indication could be per MR-DC mode basis. In this situation, the capability indication of the UE may be configured based on a per MR-DC mode basis according to a third preset rule. E.g., the UE is configured to support HO with PSCell for an EN-DC mode, or the UE is configured to support HO with PSCell for an NR-DC mode. The third preset rule can be set according to actual needs and is not limited here.

With three exemplary configuration modes of the capability indication of the UE provided above, it should be understood that the capability indication of the UE can also be configured in other ways. For example, the capability indication of the UE is configured by combining any two of the foregoing exemplary configuration modes.

In TS37.340, supported HO scenarios are defined as table-1 shown below.

TABLE 1

| HO from (row) | E-UTRA with EPC | E-UTRA with 5GC | NR | GERAN or UTRAN | EN-DC | NGEN-DC | NE-DC | NR-DC |
|---|---|---|---|---|---|---|---|---|
| E-UTRA with EPC | YES | YES | YES | YES | YES | NO | NO | NO |
| E-UTRA with 5GC | YES | YES | YES | NO | NO | YES | NO | NO |
| NR | YES | YES | YES | — | YES | NO | YES | YES |
| GERAN or UTRAN | YES | NO | NO | YES | NO | NO | NO | NO |
| EN-DC | YES | YES | YES | YES | YES | NO | NO | NO |
| NGEN-DC | YES | YES | YES | NO | NO | YES | NO | NO |
| NE-DC | YES | YES | YES | — | NO | NO | YES | NO |
| NR-DC | YES | YES | YES | — | NO | NO | NO | YES |

For the HO with the target PSCell, RAN2 identified as "LTE to EN-DC", "NR-SA to EN-DC", "NR-SA to NE-DC", "NR-SA to NR-DC", "EN-DC to EN-DC", "NE-DC to NE-DC" and "NR-DC to NR-DC". Thus, in RAN4 requirements, all the scenarios in RAN2 can be considered.

In some embodiments, a network mode of a UE could be any of NR SA, EN-DC, NE-DC and NR-DC, and scenarios of an HO with a target PSCell may be any of NR SA to EN-DC, EN-DC to EN-DC, NE-DC to NE-DC, and NR-DC to NR-DC.

According to some embodiments, taking the network mode into consideration, the HO command could be generated by the network at least in response to determining that the UE supports the HO with the target PSCell in the current network mode and that the UE supports the HO with the target PSCell in the network mode of the target PCell.

Taking the above scenario of the HO with the PSCell as an example, according to some embodiments, the UE may be configured to support the HO with the target PSCell when the UE is in any of the following network modes: NR-DC with a frequency band combination of a first frequency range (FR1) and a second frequency range (FR2); and NE-DC with a frequency band combination of FR1 and a long term evolution (LTE) frequency range. In other words, if a UE is working in FR1+FR2 NR-DC or FR1+LTE NE-DC mode, the network shall configure HO with PSCell to this UE, and the network shall configure HO with PSCell to this UE for a target MR-DC mode (i.e., the network mode of the target PCell) that is "FR1+FR2 NR-DC" or "FR1+LTE NE-DC".

Taking the above scenario of the HO with the PSCell as an example, according to some embodiments, the UE may be configured to not support the HO with the target PSCell when the UE is in any of the following network modes: NR-DC with a frequency band combination of FR1; NR-DC with a frequency band combination of FR2; and NE-DC with a frequency band combination of FR2 and E-UTRA frequency range. In other words, if a UE is working in FR1+FR1 NR-DC or FR2+LTE NE-DC mode, the network shall not configure HO with PSCell to this UE, and the network shall not configure HO with PSCell to this UE for a target MR-DC mode that is "FR1+FR1 NR-DC" or "FR2+LTE NE-DC".

It is obvious that the foregoing is only examples to illustrate how to configure the UE to support or not support the HO with the target PSCell in consideration of network modes. For a specific communication standard, whether the UE supports the HO with the target PSCell in different network modes may be configured where appropriate.

The following takes several exemplary scenarios as examples to describe UE HO period planning with the target PSCell addition/change in consideration of the network mode.

In a first exemplary embodiment, HO period planning with the target PSCell addition/change is depicted for NR SA to EN-DC.

Referring to FIG. 3 to FIG. 5, when UE receives an RRC message (i.e., an HO command) implying handover to EN-DC on slot n, the time period of HO with PSCell addition/change from NR SA to EN-DC could be:

$$T_{handover\_with\_PSCell} = T_{RRC\_procedure\_delay} + T_{interrupt} + T_{msg2} + T_{msg4} + T_{config\_PSCell} - X_{ms},$$

where $T_{RRC\_procedure\_delay}$ is the RRC message processing time for the HO with the target PSCell, and $T_{interrupt}$ is the conventional handover period as defined in TS38.133 section 6.1.2.1.3 (HO from NR to LTE).

For $T_{msg2}$:

If alt2 or alt3 is used. $T_{msg2}$ is delay from slot n+($T_{RRC\_procedure\_delay}+T_{interrupt}$)/NR slot length until UE has obtained RACH response (msg2) from the target PCell.

$T_{msg2}=0$ if alt1 is used.

For $T_{msg4}$:

If alt3 with CBRA is used, $T_{msg4}$ is delay from slot n+($T_{RRC\_procedure\_delay}+T_{interrupt}+T_{msg2}$)/NR slot length until UE has obtained msg4 from the target PCell.

$T_{msg4}=0$ if alt1 or alt2 is used.

$T_{config\_PSCell}$ is the conventional PSCell configuration period as defined in TS36.133 section 7.31.2 (PSCell addition for EN-DC).

$X_{ms}$ is a predefined positive value, it may be equivalent to:

the RRC message processing time to decode the conventional NR to LTE handover, or the RRC message processing time to decode the conventional PSCell configuration for EN-DC, or other fixed values.

Referring to FIG. 3 to FIG. 5, in a second exemplary embodiment, HO period planning with the target PSCell addition/change is depicted for EN-DC to EN-DC.

When UE receives an RRC message implying handover to EN-DC on slot n, the time period of HO with PSCell for EN-DC to EN-DC could be:

$$T_{handover\_with\_PSCell} = T_{RRC\_procedure\_delay} + T_{interrupt} + T_{msg2} + T_{msg4} + T_{config\_PSCell} - X_{ms},$$

where $T_{RRC\_procedure\_delay}$ is the RRC message processing time for the HO with the target PSCell, and $T_{interrupt}$ is the conventional handover period as defined in TS36.133 section 5.1.2.1.2.1 (HO from LTE to LTE).

For $T_{msg2}$:

If alt2 or alt3 is used, $T_{msg2}$ is delay from slot n+($T_{RRC\_procedure\_delay}$+$T_{interrupt}$)/NR slot length until UE has obtained RACH response (msg2) from the target PCell.

$T_{msg2}$=0 if alt1 is used.

For $T_{msg4}$:

If alt 3 with CBRA is used, $T_{msg4}$ is delay from slot n+($T_{RRC\_procedure\_delay}$+$T_{interrupt}$+$T_{msg2}$)/NR slot length until UE has obtained msg4 from the target PCell.

$T_{msg4}$=0 if alt1 or alt2 is used.

$T_{config\_PSCell}$ is the conventional PSCell configuration period as defined in TS36.133 section 7.31.2 (PSCell addition for EN-DC).

$X_{ms}$ is a predefined positive value, it may be equivalent to:
the RRC message processing time to decode the conventional LTE to LTE handover, or
the RRC message processing time to decode the conventional PSCell configuration for EN-DC, or
other fixed values.

Referring to FIG. 3 to FIG. 5, in a third exemplary embodiment, HO period planning with the target PSCell addition/change is depicted for NE-DC to NE-DC.

When the UE receives an RRC message implying handover to NE-DC on slot n, the time period of HO with PSCell for NE-DC to NE-DC could be:

$$T_{handover\_with\_PSCell}=T_{RRC\_procedure\_delay}+T_{interrupt}+T_{msg2}+T_{msg4}+T_{config\_EUTRAN-PSCell}-X_{ms},$$

where $T_{RRC\_procedure\_delay}$ is the RRC message processing time for the HO with the target PSCell, and $T_{interrupt}$ is the conventional handover period as defined in TS38.133 section 6.1.1.2.2 (HO from NR FR1 to NR FR1).

For $T_{msg2}$:

If alt2 or alt3 is used, $T_{msg2}$ is delay from slot n+($T_{RRC\_procedure\_delay}$+$T_{interrupt}$)/NR slot length until UE has obtained RACH response (msg2) from the target PCell.

$T_{msg2}$=0 if alt1 is used.

For $T_{msg4}$:

If alt 3 with CBRA is used, $T_{msg4}$ is delay from slot n+($T_{RRC\_procedure\_delay}$+$T_{interrupt}$+$T_{msg2}$)/NR slot length until UE has obtained msg4 from the target PCell.

$T_{msg4}$=0 if alt1 or alt2 is used.

$T_{config\_EUTRAN-PSCell}$ is the conventional PSCell configuration period as defined in TS38.133 section 8.8.2 (PSCell addition for NE-DC).

$X_{ms}$ is a predefined positive value, it may be equivalent to:
the RRC message processing time to decode the conventional NR FR1 to NR FR1 handover, or
the RRC message processing time to decode the conventional PSCell configuration for NE-DC, or
other fixed values.

Referring to FIG. 3 to FIG. 5, in a fourth exemplary embodiment, HO period planning with the target PSCell addition/change is depicted for NR-DC to NR-DC.

When the UE receives an RRC message implying handover to NR-DC on slot n, the time period of HO with PSCell for NR-DC to NR-DC could be:

$$T_{handover\_with\_PSCell}=T_{RRC\_procedure\_delay}+T_{interrupt}+T_{msg2}+T_{msg4}+T_{config\_PSCell}-X_{ms},$$

where $T_{RRC\_procedure\_delay}$ is the RRC message processing time for the HO with the target PSCell, and $T_{interrupt}$ is the conventional handover period as defined in TS38.133 section 6.1.1.2.2 (HO from NR FR1 to NR FR1).

For $T_{msg2}$:

If alt2 or alt3 is used, $T_{msg2}$ is delay from slot n+($T_{RRC\_procedure\_delay}$+$T_{interrupt}$)/NR slot length until UE has obtained RACH response (msg2) from the target PCell.

$T_{msg2}$=0 if alt1 is used

For $T_{msg4}$:

If alt 3 with CBRA is used, $T_{msg4}$ is delay from slot n+($T_{RRC\_procedure\_delay}$+$T_{interrupt}$+$T_{msg2}$)/NR slot length until UE has obtained msg4 from the target PCell.

$T_{msg4}$=0 if alt1 or alt2 is used.

$T_{config\_PSCell}$ is the conventional PSCell configuration period as defined in TS38.133 section 8.9.2 (PSCell addition for NR-DC).

$X_{ms}$ is a predefined positive value, it may be equivalent to:
the RRC message processing time to decode the conventional NR FR1 to NR FR1 handover, or
the RRC message processing time to decode the conventional PSCell configuration for NR-DC, or
other fixed values.

In the above four exemplary embodiments, specific implementations of alt1 to alt4 can be understood by referring to the above content, and will not be repeated here.

Figure 8:
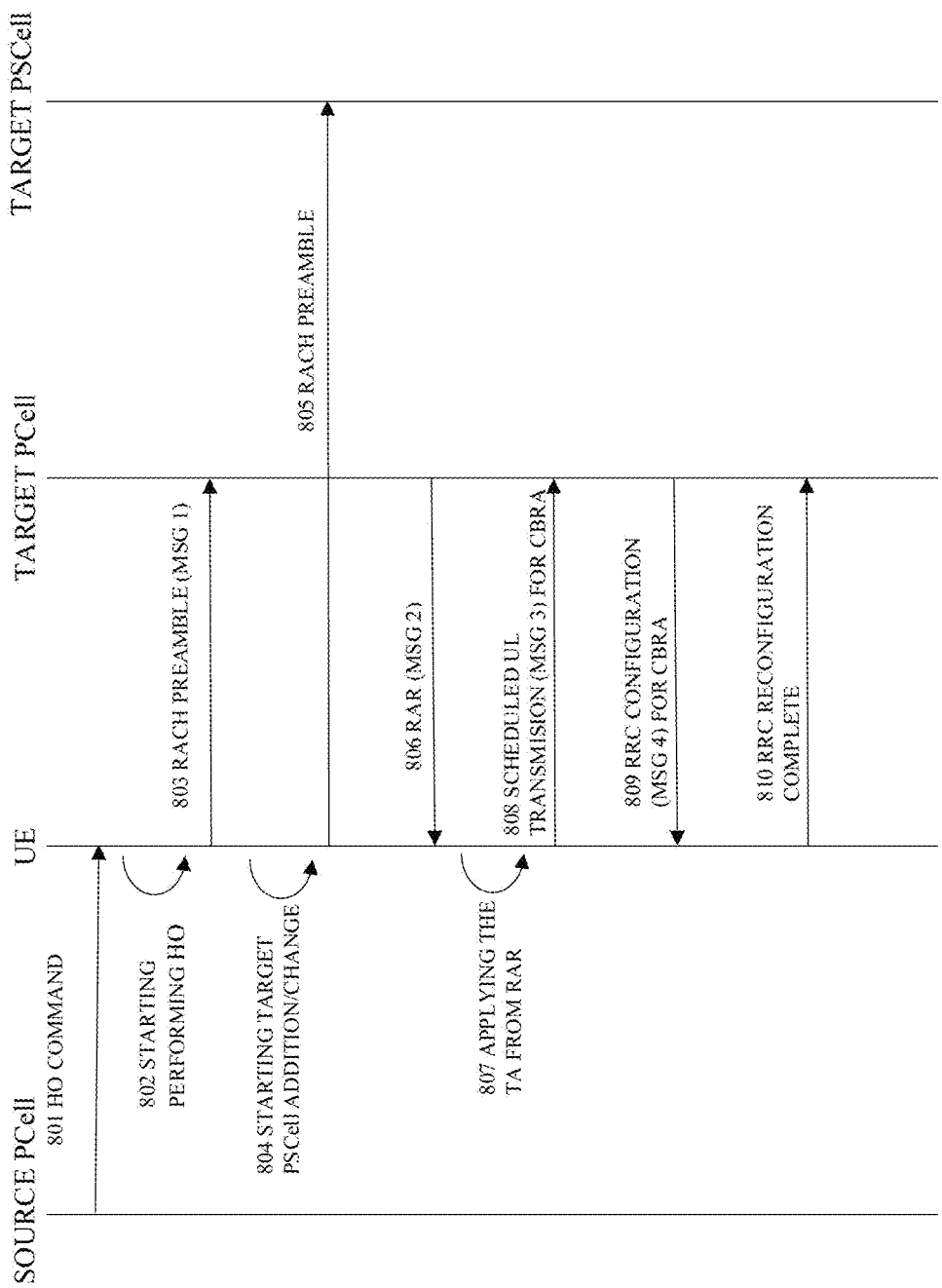
FIG. 8 illustrates a flowchart for exemplary steps for handover with PSCell addition/change.

FIG. 8 illustrates a flowchart for exemplary steps for handover with PSCell addition/change.

In FIG. 8, the steps of the method for a UE, the method for a network device of PCell and the method for a network device of SCell during the HO with the PSCell addition/change are shown.

At Step 801, the source PCell may transmit an HO command to the UE instructing the HO with a target PSCell.

At Step 802, in response to receiving the HO command, starting performing the HO with the target PSCell. Step 802 can be implemented according to the description with reference to Step S201.

At Step 803, the UE transmits a RACH preamble to the target PCell. The target PCell may generate an RAR for the UE in response to receiving the RACH preamble.

At Step 804, in response to sending the RACH preamble to the target PCell, the IE can start perform the PSCell addition/change. Step 804 can be implemented according to the description with reference to Step S202.

At Step 805, the UE first transmits the RACH preamble to the target PSCell during the PSCell addition/change.

At Step 806, the UE receives the RAR from the target PCell, where the RAR can include a TA command.

At Step 807, the UE may apply the TA command.

At Step 808, the UE transmits a scheduled UL transmission for CBRA after the TA command is performed. The target PCell may generate an RRC configuration for the UE.

At Step 809, the UE receives the RRC configuration. The UE may generate an RRC reconfiguration complete message after the RRC configuration is completed.

At Step 810, the UE transmits the RRC reconfiguration complete message to the target PCell.

According to another aspect of the present disclosure, there is provided an apparatus for a user equipment (UE), where the apparatus comprises: one or more processors configured to perform steps of the method according to the method described above.

According to another aspect of the present disclosure, there is provided a computer readable medium having computer programs stored thereon which, when executed by one or more processors, cause an apparatus to perform steps of the method according to the method described above.

According to another aspect of the present disclosure, there is provided a computer program product comprising computer programs which, when executed by one or more processors, cause an apparatus to perform steps of the method according to the method described above.

Figure 9:
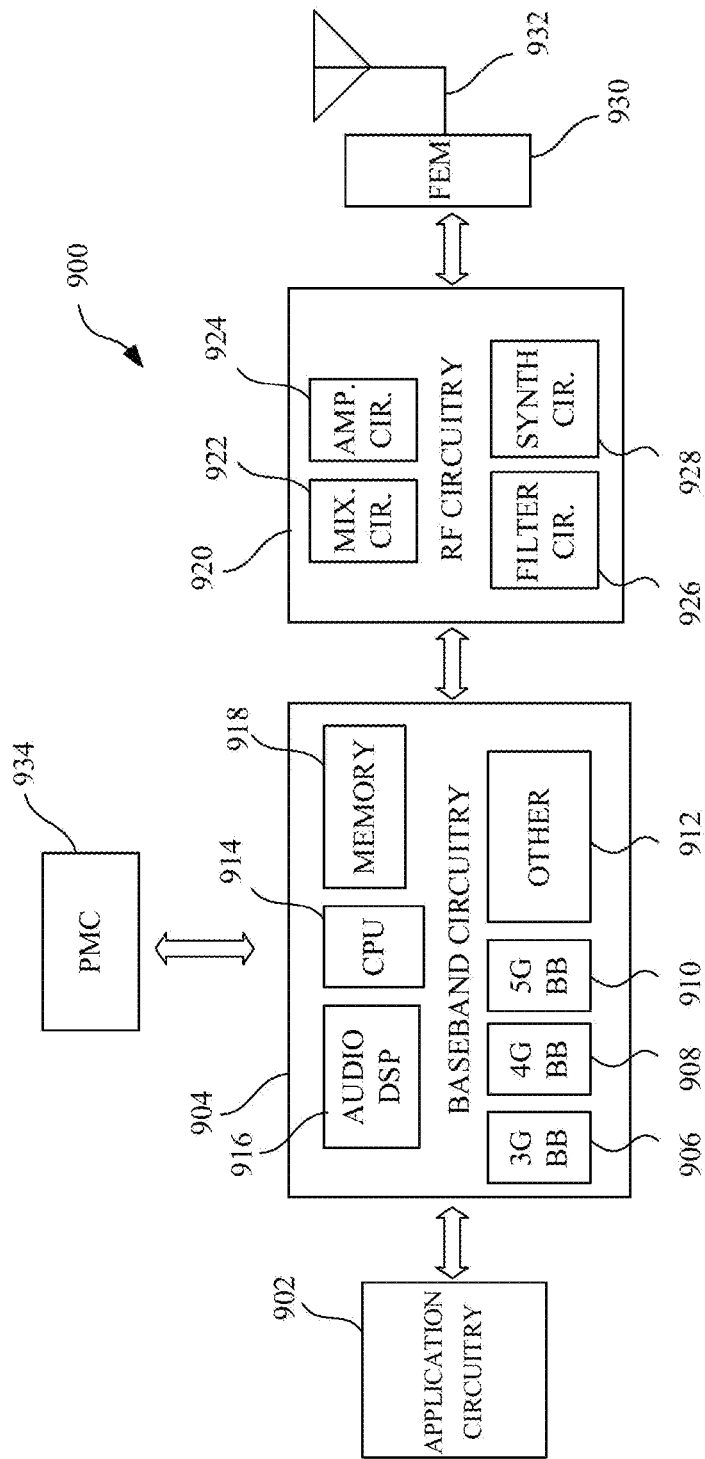
FIG. 9 illustrates a communication device (e.g., a UE or a base station) in accordance with some embodiments of the present application.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission. [0141] In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional –N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage-controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
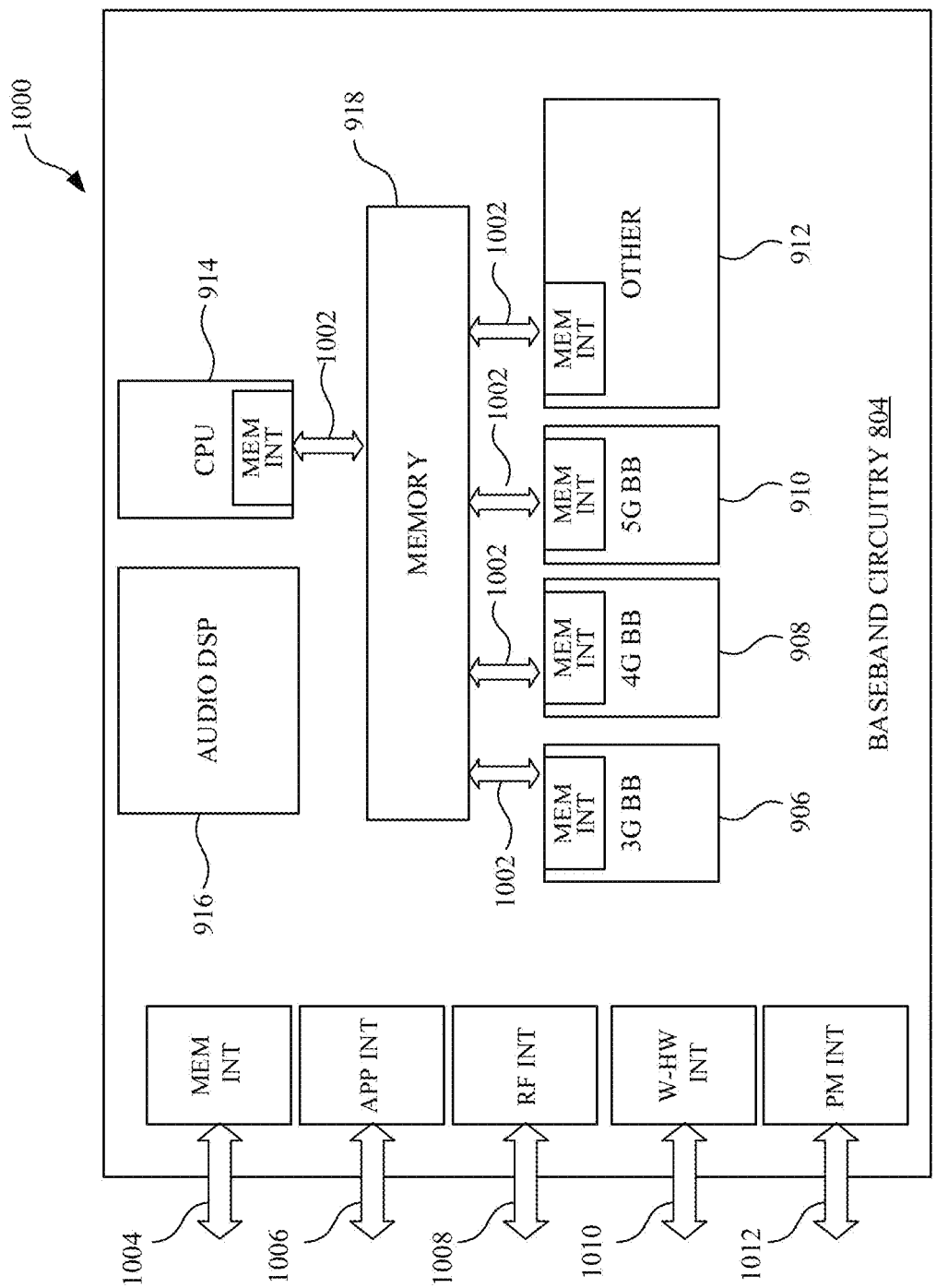
FIG. 10 illustrates example interfaces of baseband circuitry in accordance with some embodiments of the present application.

FIG. 10 illustrates example interfaces 1000 of baseband circuitry in accordance with some embodiments. As discussed above, the baseband circuitry 904 of FIG. 9 may include 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
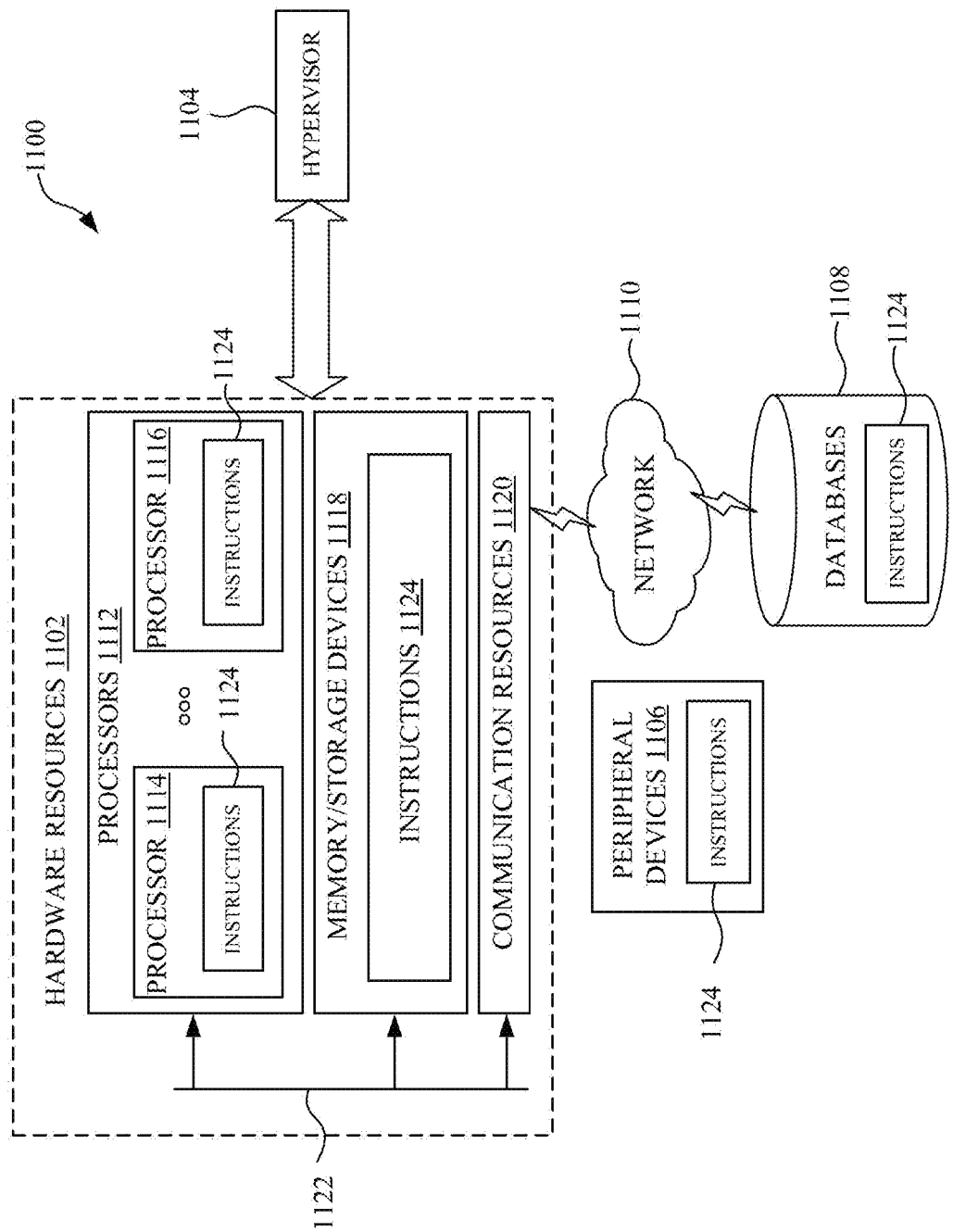
FIG. 11 illustrates components in accordance with some embodiments of the present application.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1111. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
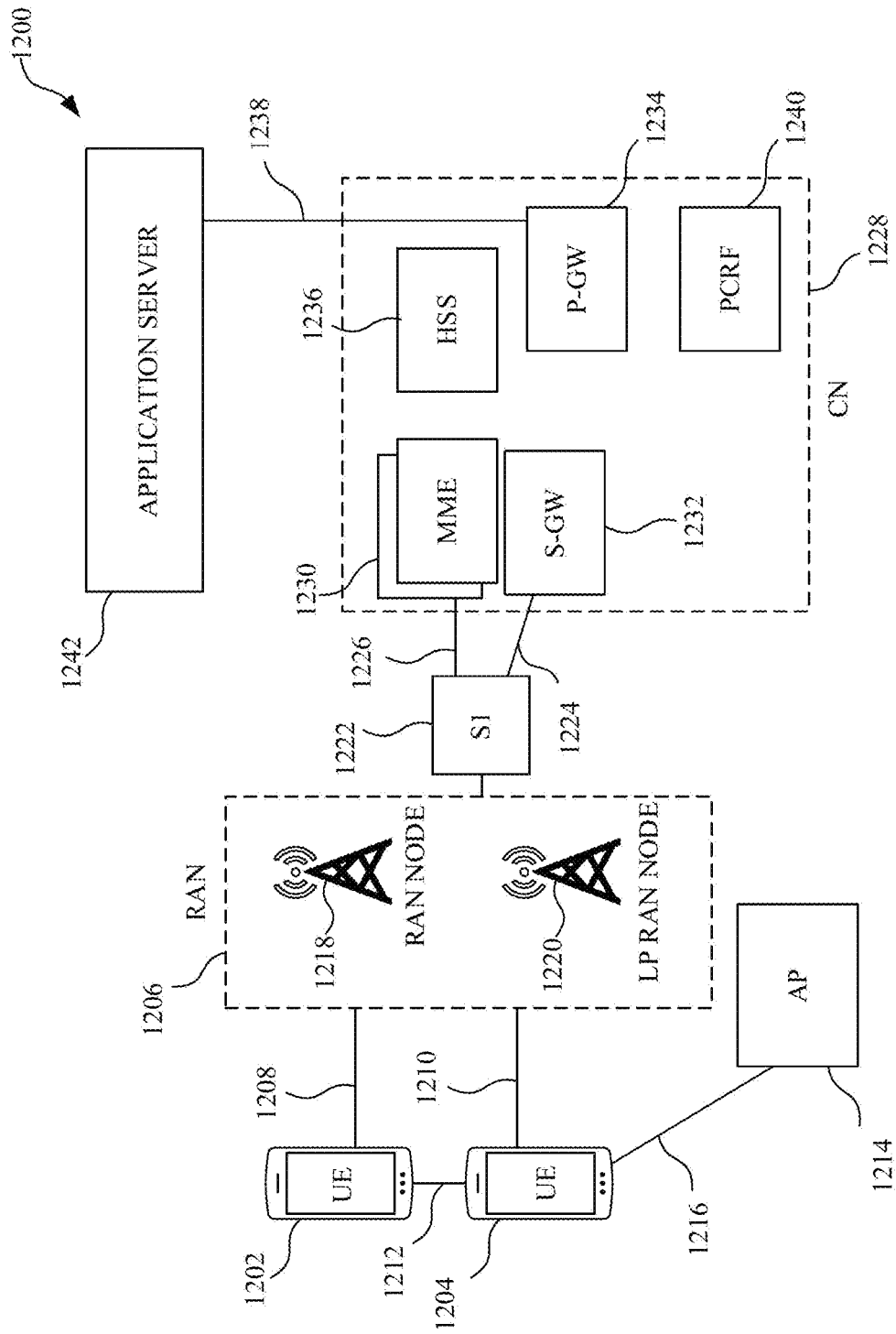
FIG. 12 illustrates an architecture of a wireless network in accordance with some embodiments of the present application.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. [0102] The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which includes a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1 124, via connection 1216. The connection 1216 can comprise a local wireless connection, such as a connection consistent with any IEEE 802.12 protocol, where the AP 1214 would include a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 12 10. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1206 may include one or more RAN nodes for providing macrocells. e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220. [0106] Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the UE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an S1 interface 1222. In embodiments, the CN 1228 may be an evolved packet core (EPC) network, a NextGen Packet Core (NPC) network, or some other type of CN. In this embodiment the S1 interface 1222 is split into two parts: the S1-U interface 1224, which carries traffic data between the macro RAN node 1218 and the LP RAN node 1220 and a serving gateway (S-GW), shown as S-GW 1232, and an S1-mobility management entity (MME) interface, shown as S1-MME interface 1226, which is a signaling interface between the macro RAN node 1218 and LP RAN node 1220 and the MME(s) 1230. [0123] In this embodiment, the CN 1228 includes the MME(s) 1230, the S-GW 1232, a Packet Data Network (PDN) Gateway (P-GW) (shown as P-GW 1234), and an HOme subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may include a database for network users, including subscription-related information to support the network entities' handling of communication sessions. The CN 1228 may include one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the S1 interface 322 towards the RAN 1206, and routes data packets between the RAN 1206 and the CN 1228. In addition, the S-GW 1232 may be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1 142 via an IP communications interface 1238. The application server 1242 can also be configured to support one or more communication services (e.g., Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: an HOme PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QoS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), including: starting performing a handover (HO) with a target Primary Secondary Cell (PSCell) in response to receiving an HO command instructing the HO with the target PSCell, wherein the HO with the target PSCell comprises target PSCell addition/change; and performing the target PSCell addition/change in response to receiving a trigger message from a target Primary Cell (PCell) or sending a trigger message to the target PCell, wherein the trigger message is a message transmitted between the UE and the target PCell during the HO with the target PSCell.

Example 2 is the method of Example 1, wherein the performing the HO with the target PSCell includes: obtaining a RACH occasion for sending a RACH preamble to the target PCell, wherein the trigger message is the RACH preamble, and wherein the performing the target PSCell addition/change includes: performing the target PSCell addition/change in response to determining that the RACH preamble has been sent.

Example 3 is the method of Example 1, wherein the performing the HO with the target PSCell includes: obtaining a RACH occasion for sending a RACH preamble to the target PCell, wherein the trigger message is a Random Access Response (RAR) generated by the target PCell in response to receiving the RACH preamble, and wherein the performing the target PSCell addition/change includes: performing the target PSCell addition/change in response to receiving the RAR.

Example 4 is the method of Example 3, wherein the performing the HO with the target PSCell includes: accessing the target PCell via Contention Free Random Access (CFRA).

Example 5 is the method of Example 1, wherein the performing the HO with the target PSCell includes: accessing the target PCell via Contention Based Random Access (CBRA); generating an uplink scheduling message for CBRA for sending to the target PCell, wherein the trigger message is a radio resource control (RRC) configuration for CBRA generated by the target PCell in response to receiving the uplink scheduling message, and wherein the performing the target PSCell addition/change includes: performing the target PSCell addition/change in response to receiving the radio resource control (RRC) configuration for CBRA.

Example 6 is the method of Example 1, wherein the performing the HO with the target PSCell includes: generating an RRC reconfiguration complete message for sending to the target PCell, in response to determining that the RRC configuration is complete, wherein the trigger message is the RRC reconfiguration complete message, and wherein the performing the target PSCell addition/change includes: performing the target PSCell addition/change in response to the RRC reconfiguration complete message having been sent.

Example 7 is the method of Example 1, wherein the performing the HO with the target PSCell includes: obtaining a RACH preamble for sending to the target PCell; wherein the trigger message is an RAR generated by the target PCell in response to receiving the RACH preamble and the LIE being ready to apply a TA command carried in the RAR, and wherein the performing the target PSCell addition/change includes: performing the target PSCell addition/change in response to receiving the RAR and executing the TA command.

Example 8 is the method of one of Example 1-7, wherein the starting performing the HO with the target PSCell in response to receiving the HO command instructing the HO with the target PSCell includes: performing timekeeping in response to receiving the HO command; and starting performing the HO with the target PSCell in response to the timekeeping reaching a preset release time.

Example 9 is the method of one of Example 1-7, further including: obtaining a capability indication indicating whether the UE supports HO with PSCell addition/change in Multi-RAT Dual Connectivity (MR-DC) for sending to a network, wherein the HO command is generated by the network at least in response to determining that the obtained capability indication indicates that the UE supports the HO with PSCell addition/change.

Example 10 is the method of Example 9, wherein the capability indication is per-UE basis.

Example 11 is the method of Example 9, wherein the capability indication is per-BC basis.

Example 12 is the method of Example 9, wherein the capability indication is per MR-DC mode basis.

Example 13 is the method of Example 12, wherein a network mode of the UE includes any of: New Radio (NR) standalone (SA), Long Term Evolution (LTE)-New Radio Dual connectivity (EN-DC), New Radio-E-UTRA Dual connectivity (NE-DC) and New Radio Dual connectivity (NR-DC).

Example 14 is the method of Example 13, wherein a scenario for the HO with the target PSCell includes any of: NR SA to EN-DC; EN-DC to EN-DC; NE-DC to NE-DC; and NR-DC to NR-DC.

Example 15 is the method of one of Example 1-7, wherein the HO command is generated by a network at least in response to determining that the UE supports the HO with the target PSCell in a current network mode and determining that the UE supports the HO with the target PSCell in a network mode of the target PCell.

Example 16 is the method of Example 15, wherein the UE is configured to support the HO with the target PSCell when the UE is in any of the following network modes: NR-DC with a frequency band combination of a first frequency range (FR1) and a second frequency range (FR2); and NE-DC with a frequency band combination of FR1 and a long term evolution (LTE) frequency range.

Example 17 is the method of Example 15, wherein the UE is configured to not support the HO with the target PSCell when the UE is in any of the following network modes: NR-DC with a frequency band combination of FR1; NR-DC with a frequency band combination of FR2; and NE-DC with a frequency band combination of an FR2 and an E-UTRA frequency range.

Example 18 is an apparatus for a user equipment (UE), the apparatus including: one or more processors configured to perform steps of the method according to any of Examples 1-17.

Example 19 is a computer readable medium having computer programs stored thereon which, when executed by one or more processors, cause an apparatus to perform steps of the method according to any of Examples 1-17.

Example 20 is an apparatus for a communication device, including means for performing steps of the method according to any of Examples 1-17.

Example 21 is a computer program product including computer programs which, when executed by one or more processors, cause an apparatus to perform steps of the method according to any of Examples 1-17.

Any of the examples described above may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
   starting performing a handover (HO) with a target Primary Secondary Cell (PSCell) in response to receiving an HO command instructing the HO with the target PSCell, wherein the HO with the target PSCell comprises target PSCell addition/change; and
   performing the target PSCell addition/change in response to receiving a trigger message from a target Primary Cell (PCell) or sending the trigger message to the target PCell, wherein the trigger message is a message transmitted between the UE and the target PCell during the HO with the target PSCell,
   wherein the performing the HO with the target PSCell comprises:
      accessing the target PCell via Contention Based Random Access (CBRA);
      generating an uplink scheduling message for the CBRA for sending to the target PCell,
      wherein the trigger message is a radio resource control (RRC) configuration for CBRA generated by the target PCell in response to receiving the uplink scheduling message, and
      wherein the performing the target PSCell addition/change comprises:
         performing the target PSCell addition/change in response to receiving the RRC configuration for CBRA.

2. The method according to claim 1, wherein the performing the HO with the target PSCell comprises:
   obtaining a Random Access Channel (RACH) occasion for sending a RACH preamble to the target PCell,
   wherein the trigger message is the RACH preamble, and
   wherein the performing the target PSCell addition/change comprises:
      performing the target PSCell addition/change in response to determining that the RACH preamble has been sent.

3. The method according to claim 1, wherein the performing the HO with the target PSCell comprises:
   obtaining a RACH occasion for sending a RACH preamble to the target PCell,
   wherein the trigger message is a Random Access Response (RAR) generated by the target PCell in response to receiving the RACH preamble, and
   wherein the performing the target PSCell addition/change comprises:
      performing the target PSCell addition/change in response to receiving the RAR.

4. The method according to claim 3, wherein the performing the HO with the target PSCell comprises:
   accessing the target PCell via Contention Free Random Access (CFRA).

5. The method according to claim 1, wherein the starting performing the HO with the target PSCell in response to receiving the HO command instructing the HO with the target PSCell comprises:
   performing timekeeping in response to receiving the HO command; and
   starting performing the HO with the target PSCell in response to the timekeeping reaching a preset release time.

6. The method according to claim 1, further comprising:
   obtaining a capability indication indicating whether the UE supports HO with PSCell addition/change in Multi-RAT Dual Connectivity (MR-DC) for sending to a network,
   wherein the HO command is generated by the network at least in response to determining that the obtained capability indication indicates that the UE supports the HO with PSCell addition/change.

7. The method according to claim 6, wherein the capability indication is per-UE basis.

8. The method according to claim 6, wherein the capability indication is per-band combination (BC) basis.

9. The method according to claim 6, wherein the capability indication is per MR-DC mode basis.

10. The method according to claim 9, wherein a network mode of the UE comprises any of:
    New Radio (NR) standalone (SA), Long Term Evolution (LTE)-New Radio Dual connectivity (EN-DC), New Radio-E-UTRA Dual connectivity (NE-DC) and New Radio Dual connectivity (NR-DC).

11. The method according to claim 10, wherein a scenario for the HO with the target PSCell comprises any of:
    NR SA to EN-DC;
    EN-DC to EN-DC;
    NE-DC to NE-DC; and
    NR-DC to NR-DC.

12. The method according to claim 1, wherein the HO command is generated by a network at least in response to determining that the UE supports the HO with the target PSCell in a current network mode and that the UE supports the HO with the target PSCell in a network mode of the target PCell.

13. The method according to claim 12, wherein the UE is configured to support the HO with the target PSCell when the UE is in any of the following network modes:
    NR-DC with a frequency band combination of a first frequency range (FR1) and a second frequency range (FR2); and
    NE-DC with a frequency band combination of FR1 and a long term evolution (LTE) frequency range.

14. The method according to claim 12, wherein the UE is configured to not support the HO with the target PSCell when the UE is in any of the following network modes:
    NR-DC with a frequency band combination of FR1;
    NR-DC with a frequency band combination of FR2; and
    NE-DC with a frequency band combination of FR2 and E-UTRA frequency range.

* * * * *